United States Patent [19]

Wiknich

[11] 4,323,152
[45] Apr. 6, 1982

[54] ACCUMULATING CONVEYOR
[75] Inventor: Douglas D. Wiknich, Davisburg, Mich.
[73] Assignee: LaSalle Machine Tool, Inc., Troy, Mich.
[21] Appl. No.: 144,561
[22] Filed: Apr. 28, 1980
[51] Int. Cl.³ .............................................. B65G 25/02
[52] U.S. Cl. ..................................... 198/751; 198/774
[58] Field of Search ................ 198/460, 718, 751, 774
[56] References Cited

U.S. PATENT DOCUMENTS 3,747,741  7/1973  Brenis .............................. 198/774 X
4,254,860  3/1981  Koontz ................................. 198/751

Primary Examiner—Robert B. Reeves
Assistant Examiner—Douglas D. Watts
Attorney, Agent, or Firm—Olsen and Stephenson

[57] ABSTRACT

An accumulating conveyor comprising an elongated support along which a plurality of articles are movable through a series of longitudinally spaced apart stations, a transfer bar movable up and down and back and forth with respect to the elongated support, independently movable feed members pivotally mounted on the transfer bar at spaced apart positions corresponding with the spacing between the stations, a plurality of feed member setting units operatively associated with the feed members, flexible connecting means connecting adjacent ones of the feed member setting units, and sensing means at each station for sensing the absence of an article. When there is an unoccupied station, an initial upward movement of the transfer bar from a start position actuates the feed setting unit that is associated with the feed member at the station next following the empty station to move the feed member thereat to a feed position. The flexible connecting means acts in response to movement of the feed member setting unit associated with the feed member at the station next following the empty station to actuate the remaining feed member setting units to move their associated feed members to the feed positions. After all feed members behind an empty station are set in their feed positions, the transfer bar is moved to advance the feed members to the next station. It then is lowered and returned to the start position.

12 Claims, 10 Drawing Figures

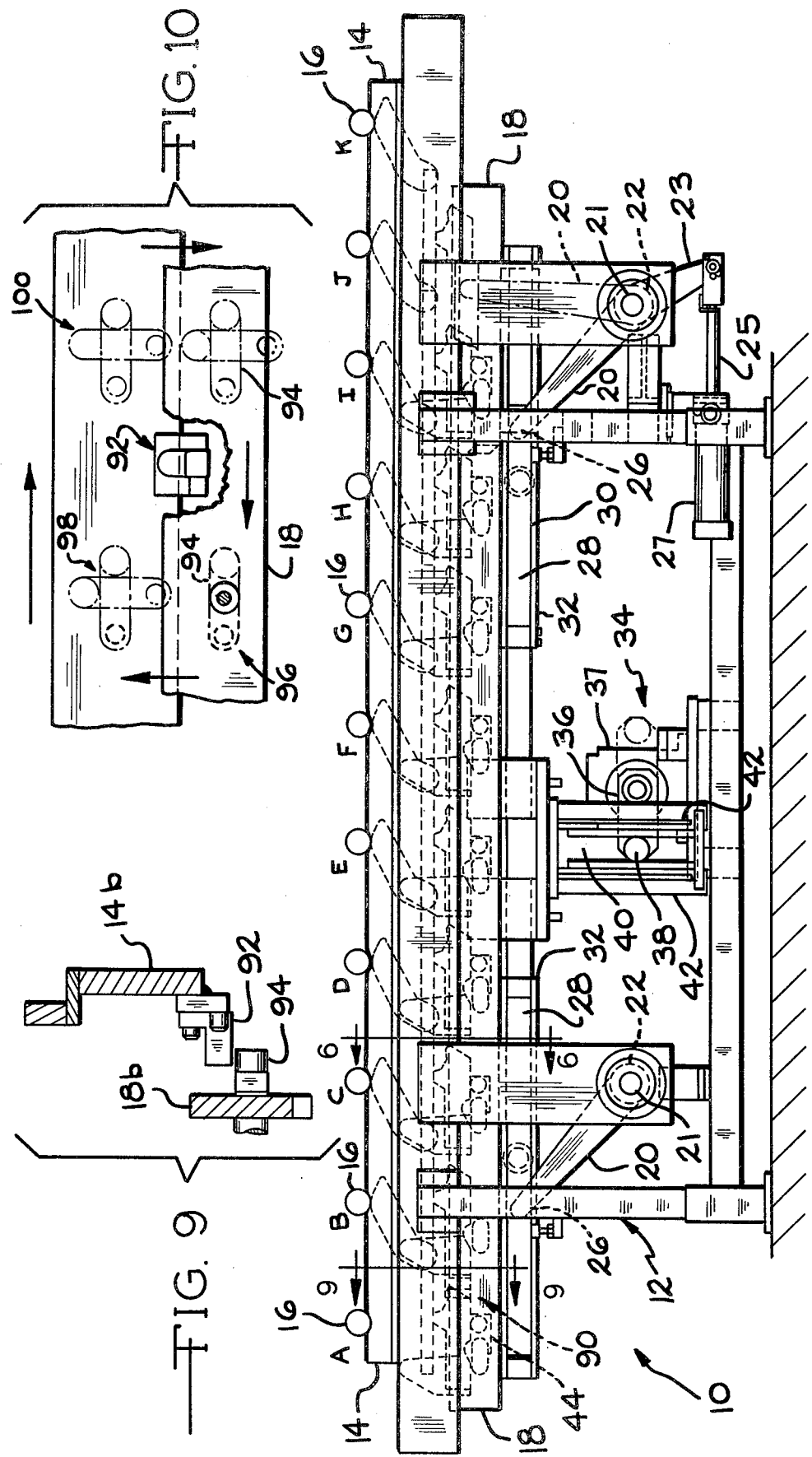

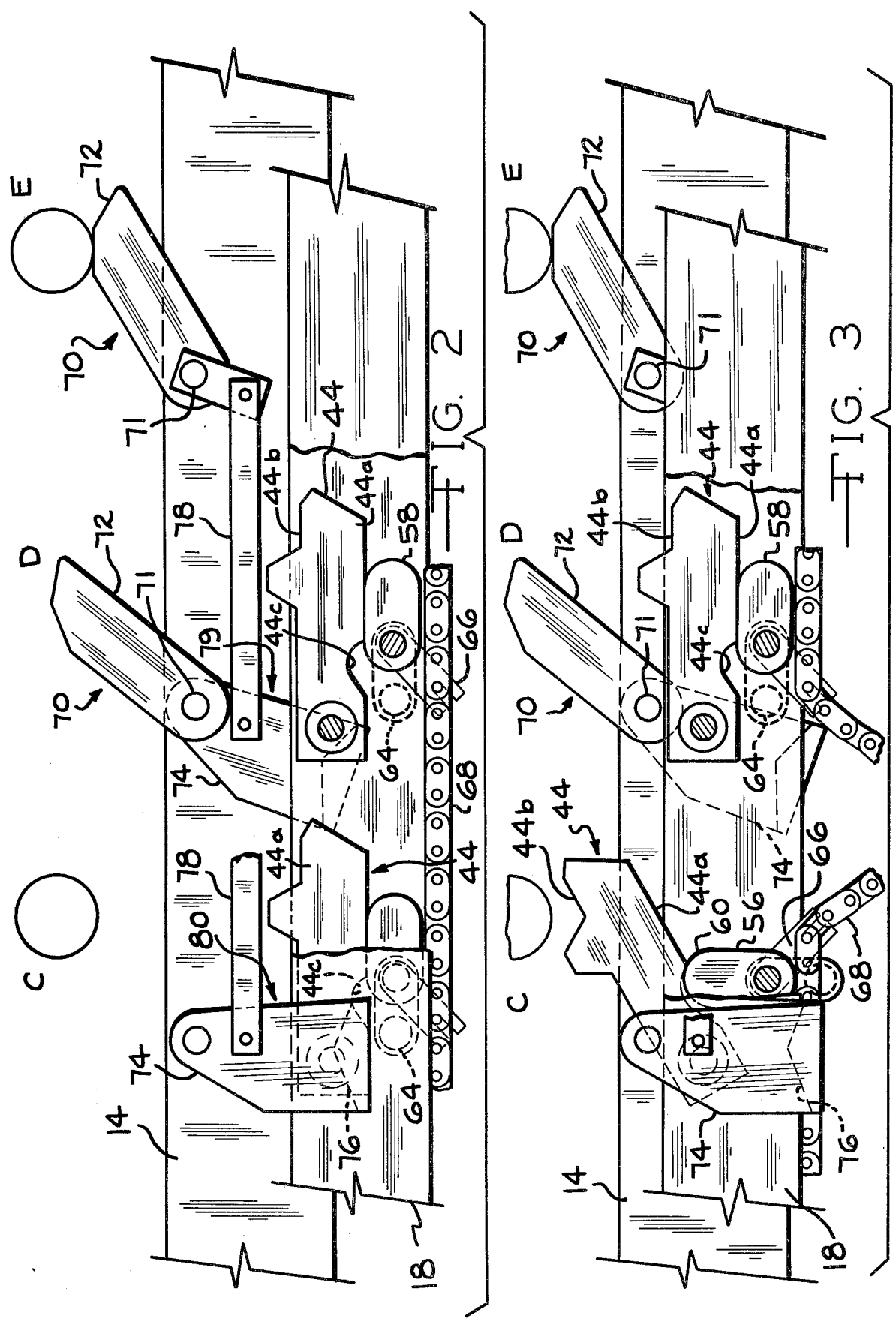

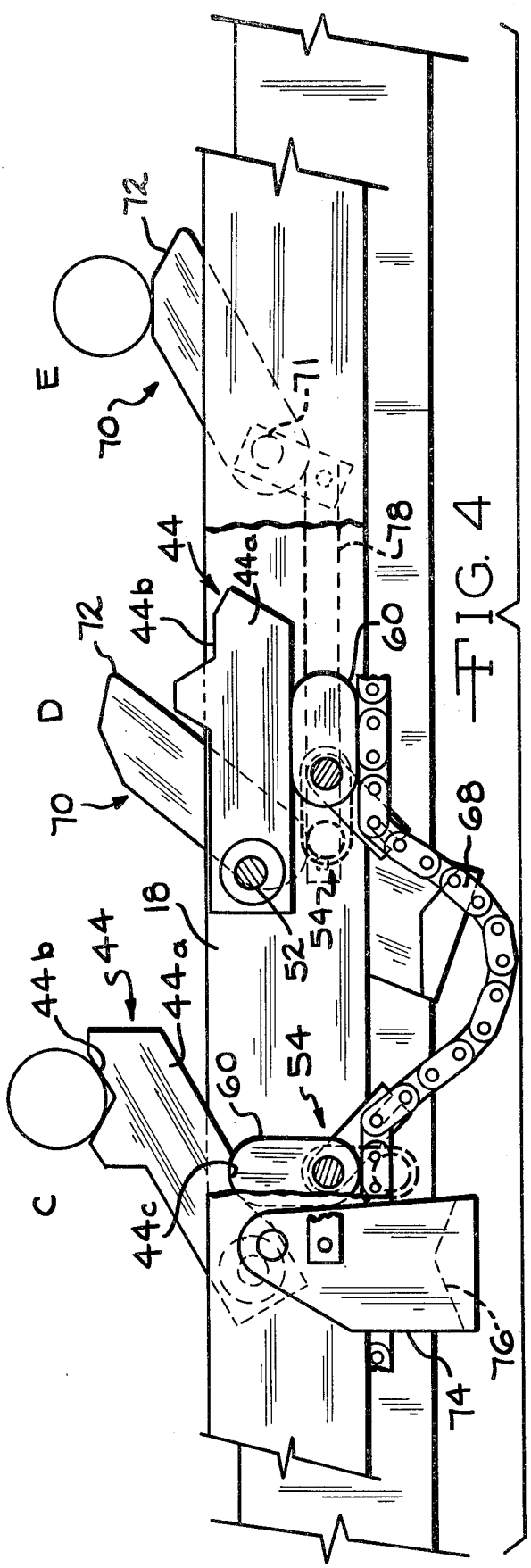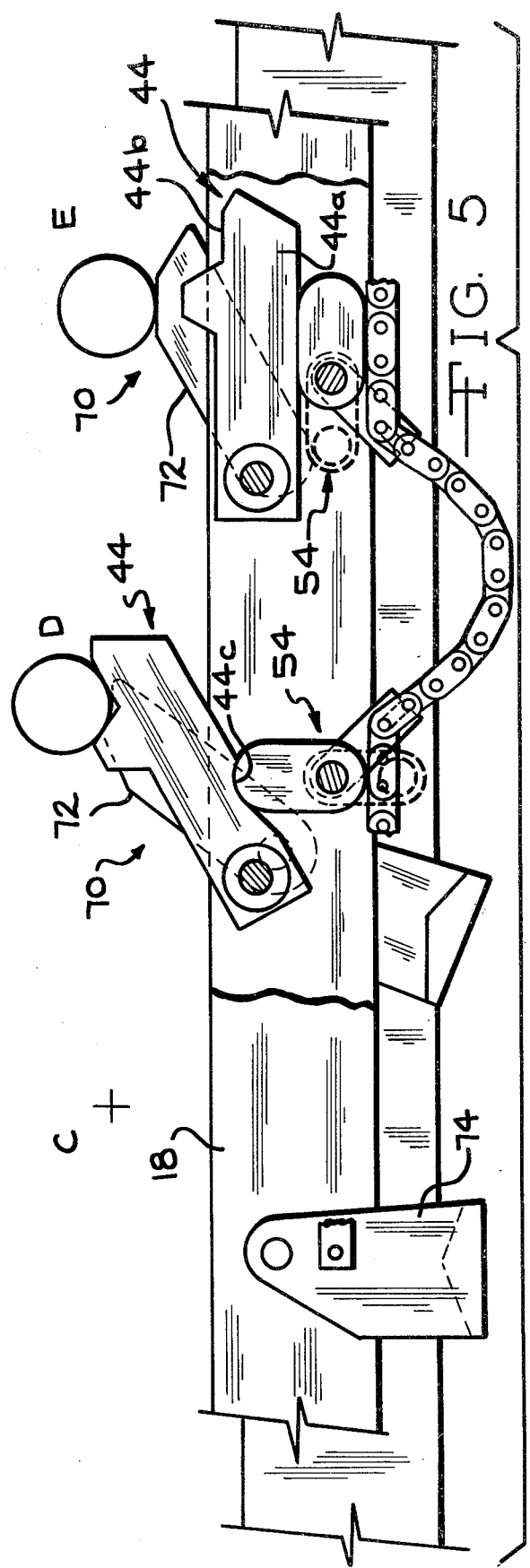

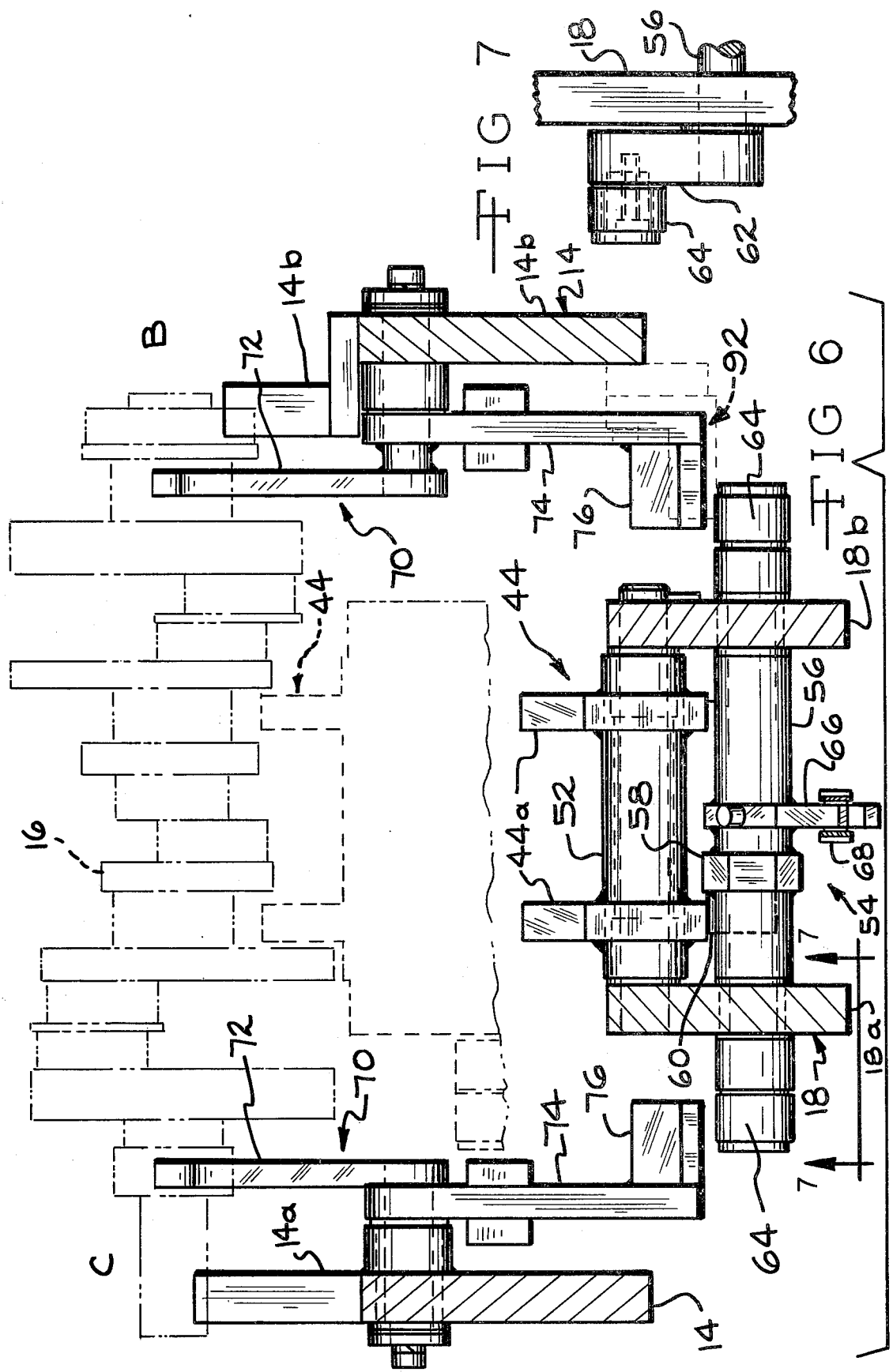

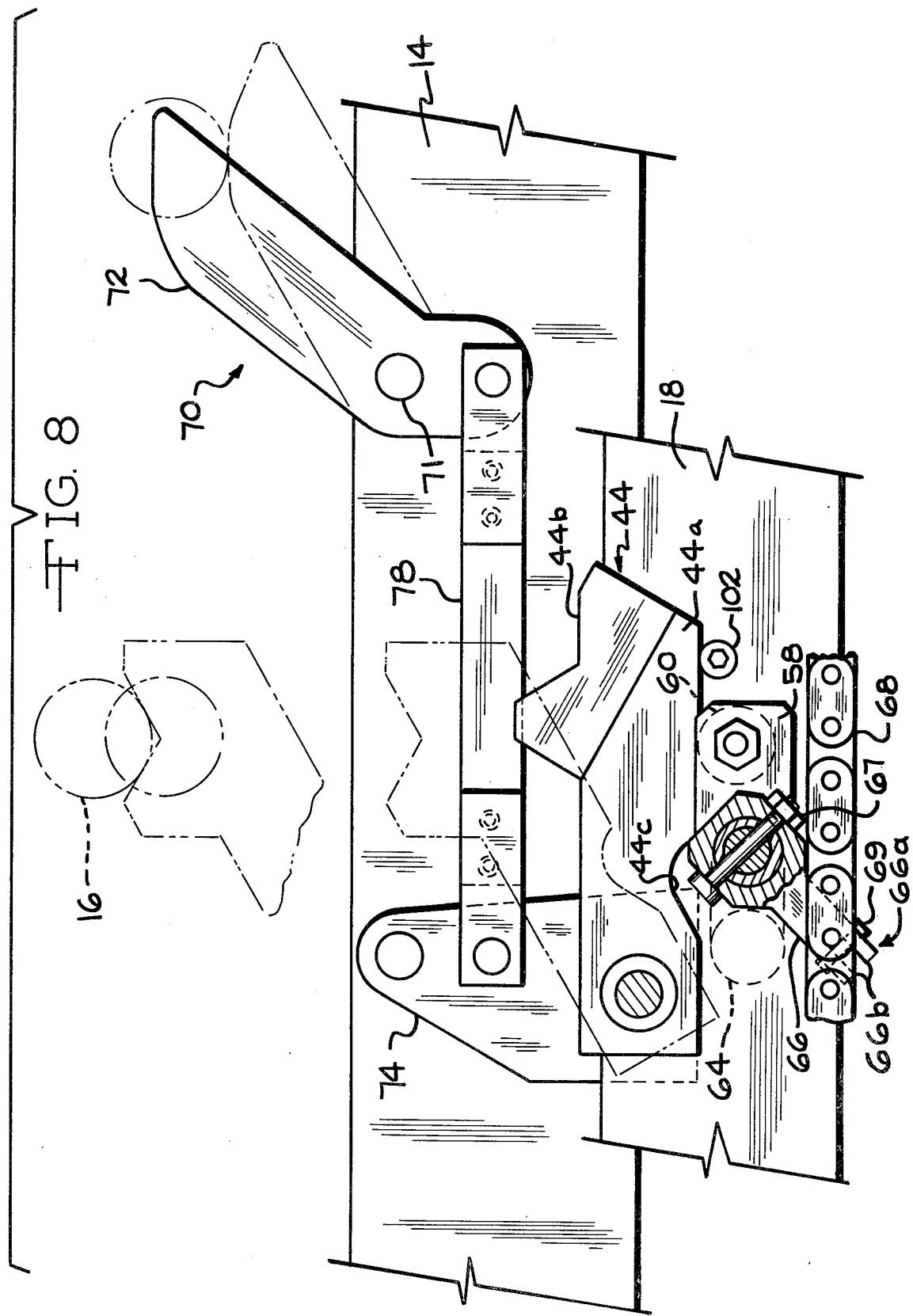

ACCUMULATING CONVEYOR

BACKGROUND OF THE INVENTION

The present invention provides an accumulating conveyor having a mechanical system for sensing empty stations and for advancing articles so that all stations are occupied. U.S. Pat. Nos. 3,500,992 and 3,590,987 disclose lift and carry accumulator conveyors having reciprocal transfer slides operable upon initial forward movement to move independently movable feed members to article carrying positions. The transfer slides then are raised to lift the articles behind an empty station and advance them to the next adjacent stations. Although the accumulating conveyors disclosed in these patents perform adequately, they are relatively complex because of the added movement of the transfer slides longitudinally of the conveyors to set the feed members to their article carrying positions and therefore they are subject to additional wear and maintenance. Another disadvantage of these accumulating conveyors is that the feed members are moved through relatively large angles between their idle and feed positions. Consequently, when the feed members are returned to their idle positions they strike their stops with high impact forces which increases the noise level in the vicinity of the conveyor and which creates added stress on the components, a stress that could lead to an early failure of the components.

It is the general object of the present invention, therefore, to provide an accumulating conveyor wherein feed members are moved to feed positions in response to an initial upward movement of the transfer bar.

It is a further object of the present invention to provide an accumulating conveyor having feed members movable through relatively small angles between idle and feed positions to provide a smooth and quiet operating accumulating conveyor.

It is another object of the present invention to provide an accumulating conveyor employing flexible connecting means for mechanically moving all feed members behind any empty station to feed positions.

It is another object of the present invention to provide an accumulating conveyor that minimizes component movement, that is reliable, and that is relatively inexpensive to manufacture and maintain.

SUMMARY OF THE INVENTION

The present invention provides an improved accumulating conveyor of the lift and carry type but one which easily can be adapted to a pusher accumulating conveyor. The accumulating conveyor comprises an elongated support formed by a pair of parallel rails having a series of equally spaced stations along which a plurality of articles are movable. A transfer bar is mounted for reciprocal movement longitudinally of the rails and for up and down reciprocating movement relative to the rails. The transfer bar is moved through a cycle of operation consisting of a first upward movement from a start position, a forward movement, a downward movement and finally a return movement to the start position.

A plurality of feed members are pivotally mounted on the transfer bar at longitudinally spaced positions corresponding with the spacing between the stations. Each feed member is operatively associated with a feed member setting unit that is pivotally mounted on the transfer bar and when actuated to an operative position moves its associated feed member from an idle position through an acute angle to a feed or article carrying position. In the disclosed embodiment, the feed members are moved between their idle and feed positions through angles that are less than forty-five degrees. Adjacent feed member setting units are connected by a flexible connecting means in the form of chain sections. Actuation of one feed member setting unit to an operative position raises its associated feed member to the feed position and causes the chain to actuate the remaining following feed member setting units to operative positions to move their associated feed members to feed or article carrying positions.

Sensing means is provided at each station for sensing the absence of an article. Upon initial upward movement of the transfer bar from the start position, the sensing means at an empty station will cause the feed member setting unit associated with the feed member at the next following station to move the feed member thereat to the feed position. The actuation of the feed member setting unit at the station next following an empty station causes the remaining following feed member setting units to be actuated to operative positions through the chain sections to move their associated feed members to article carrying positions. A continued upward movement of the transfer bar raises the feed members in the article carrying positions to engage and lift the articles behind the empty station. Next, an advancing movement of the transfer bar carries the articles to the next stations. The transfer bar then is lowered to deposit the articles at the next stations and is returned to its start position. All feed members are returned to their idle positions during the return stroke of the transfer bar. Because they are moved through relatively small angles the feed member strike their stops with little force thus generating only relatively low level noise in the vicinity of the conveyor. Furthermore, the feed members are subjected to a small impact upon return to the idle positions which reduces wear and maintenance on the conveyor.

Further objects, features and advantages of the present invention will become apparent from a consideration of the following description, the appended claims and the accompanying drawing in which:

FIG. 1 is a diagrammatic elevational view of a section of the accumulating conveyor of the present invention having stations A–K;

FIG. 2 is a fragmentary diagrammatic view of stations C, D, and E of the accumulating conveyor shown in FIG. 1;

FIG. 3 is a diagrammatic view showing stations C, D, and E of the accumulator conveyor of this invention showing a transfer bar elevated to an intermediate raised position which moves the feed members behind an empty station to article carrying positions;

FIG. 4 is a diagrammatic view like FIGS. 2 and 3 showing the transfer bar in its top position;

FIG. 5 is a diagrammatic view like FIGS. 2–4 but showing the transfer bar moved longitudinally to advance the feed members to the next stations;

FIG. 6 is an elevational view of the accumulating conveyor of the present invention taken substantially from line 6—6 in FIG. 1;

FIG. 7 is a diagrammatic view of a portion of the feed member setting means taken substantially from line 7—7 in FIG. 6;

FIG. 8 is an enlarged elevational view of a portion of the accumulating conveyor of the present invention illustrating in greater detail the structure of the components of a feed member setting unit;

FIG. 9 is a fragmentary sectional view of the accumulating conveyor showing a knockdown assembly for returning all feed member assemblies to idle positions and taken substantially from line 9—9 in FIG. 1; and FIG. 10 diagrammatically shows the positions of the feed member setting means at station A when the transfer bar is moved through a cycle of movement.

Referring to the drawing, the accumulating conveyor of the present invention, indicated generally at 10, is shown in FIG. 1 consisting of a frame 12 having a pair of parallel rails 14 (FIG. 6) which form an elongated support. A series of equally spaced stations, indicated by the letters A-K, are provided on the rails 14 along which a plurality of articles 16 such as crank shafts are movable from station to station with station A being the station where the articles are normally deposited and station K being the station where they are removed. The accumulating conveyor 10 operates to advance all articles to their next stations when an article is removed from station K or if an intermediate station, such as station D, is unoccupied to advance all articles behind the empty station to their next station.

A transfer bar 18 is mounted on the frame 12 for reciprocal movement longitudinally (horizontally) of the rails 14 and for reciprocal up and down movement relative to the rails 14. The transfer bar 18 is carried by pivotal arms 20 each of which is mounted at one end 21 to a spindle 22 that is pivotally carried by the frame 12. The other end 26 of each arm 20 is pivotally connected to a sliding bar 28 mounted for horizontal sliding movement relative to the transfer bar 18 in channels 30 formed in rails 32 that are secured to the underside of the transfer bar 18. The right hand spindle 22, as viewed in FIG. 1, is connected to a drive link 23 which in turn is connected to the piston 25 on a hydraulic cylinder 27 that is mounted on the frame 12. The cylinder 27 is shown in FIG. 1 in its fully extended position which positions the right hand arm 20 at an inclined position and by virtue of the sliding bar 28 places the left hand arm 20 at a similar inclined position wherein the transfer bar 18 is in its lowest position. When the cylinder 27 is retracted, the right spindle 22 is rotated clockwise moving the right arm 20 to a vertical position as shown in broken lines in FIG. 1. The left arm 20 is moved simultaneously on the left or idler spindle 22 as the sliding bar 28 slides to the right in the channels 30. The cooperative movement of the arms 20 and the sliding bar 28 raises the transfer bar 18 to its highest position. Actuation of the cylinder 27 to extend the rod 25 rotates the spindles 22 counterclockwise to their solid line positions causing the transfer bar 18 to be lowered. The arms 20, spindles 22, connecting bar 28 and the cylinder 27 therefore comprise the essentials of a means for reciprocally moving the transfer bar 18 up and down relative to the rails 14.

The transfer bar 18 is movable longitudinally of the rails 14 by a drive mechanism 34 carried by the frame 12. The drive mechanism 34 consists of an arm 36 having a pin member 38 slidably movable in a vertical channel 40 formed by a pair of parallel upright rail members 42 that are affixed to the transfer bar 18. Rotation of the arm 36 by a motor 37 between opposite horizontal positions (shown in solid and broken lines) will cause the transfer bar 18 to move back and forth through a distance equal to twice the length of the arm 36. Thus, means are provided for reciprocally moving the transfer bar 18 in back and forth strokes. The transfer cycle commences with the transfer bar 18 in its left and lowest position, the start position. First, the transfer bar 18 is raised to a feed member set position when the arms 20 are rotated clockwise to their vertical positions. Then, the motor 37 is operated to rotate the arm 36 clockwise moving the transfer bar 18 to the right a distance at least as great as the distance between adjacent stations. The transfer bar 18 is then lowered by pivoting the arms 20 counterclockwise and finally returned to the start position by rotating the arm 36 counterclockwise to its solid horizontal position.

The transfer bar 18 is provided with a plurality of feed member assemblies 44 that are pivotally mounted at spaced apart locations which correspond with the spacing between the stations A-K. Each feed member or article carrying assembly 44, as seen in FIGS. 2-7, is pivotally mounted on the transfer bar 18 for movement between an idle position in which the feed member assembly 44 is generally horizontal and a article carrying or feed position as shown in FIGS. 4 and 5 where the feed member assembly 44 has been pivoted through an acute angle of approximately thirty degrees. As shown in FIG. 6, the transfer bar 18 consists of a pair of spaced apart parallel rails 18a and 18b. Each feed member assembly 44 includes a pair of parallel nests or feed arms 44a affixed to a shaft 52 that is pivotally mounted on the rails 18a and 18b at a position below an associated station. The feed arms 44a have cradle end portions 44b which are pivoted to positions directly below their associated work stations in response to an initial upward movement of the transfer bar 18 from its start position. The cradles 44b are thus in positions to lift the articles 16 from the rails 14. The position of each feed member assembly 44 can be moved slightly rearwardly on the transfer bar 18 so that when the assembly 44 is pivoted to its feed position, it will be located slightly behind the article 16 when the transfer bar 18 is in its feed member set position. The transfer bar 18 would then be advanced causing all feed member assemblies 44 in the feed positions to engage and push the articles 16 to their next adjacent stations.

Each feed member assembly 44 is operatively associated with a feed member setting unit 54 that is pivotally mounted on the rails 18a-b of transfer bar 18 below the assembly 44. The feed member setting unit 54 consists of a rod 56 pivotally mounted on the rails 18a-b of the transfer bar 18, a cam or push member 58 affixed to the rod 56 for coincidental pivotal movement therewith. The push member 58 has an offset ear 60 positioned in engagement with one of the feed arms 44a (the left feed arm 44a as viewed in FIG. 6). The left arm 44a of each feed member assembly 44 has a recess 44c into which the ear 60 of the pusher 58 is positioned when the feed member assembly 44 is in its feed position to inhibit the feed member assembly 44 from freely returning to its idle position. Also affixed to the rod 56 through a link 62 is a follower member 64 that is offset from the axis of the rod 56. A cam link 66 is affixed the rod 56 centrally between the rails 18a-b connected to a chain 68 that is connected to all feed member setting units 54. As seen in FIG. 8, the cam link 66 has a bifurcated end portion 66a defined by legs 66b which straddle a cross pin in the chain 68. A lock pin 69 extends through the legs 66b to retain the chain pin in the opening between the legs 66b. The cam link 66 is slidably positioned on the rod 56 and is secured thereto by a nut and bolt assembly 67.

A sensor 70 is provided at each station for sensing the absence of an article 16. Sensors 70 are provided on both sides of the elongated support rails 14 and are arranged in an alternate array, that is, sensors 70 are provided at alternate stations on one rail 14a and are provided at the stations between the alternate stations on the other rail 14b. Accordingly, sensors 70 at the stations A, C, E, G, I and K are provided on the rail 14a as seen in FIG. 6, and sensors 70 are provided at the stations B, D, F, H, and J on the right hand rail 14b as seen in FIG. 6. Thus, the follower 64 (at station B) is associated with the sensor 70 at station B as shown on the right of FIG. 6 and the follower member 64 (at station C) is shown associated with the sensor 70 at the station C on the left of FIG. 6. Each sensor 70 consists of a sensor bar 72 (FIG. 2) pivotally mounted on the rail 14 by a pin 71. An actuator member 74 is pivotally mounted on the transfer bar 18 at a location rearwardly of the sensor bar 72 and is provided with an inwardly projecting ramp 76. A link 78 connects the sensor bar 72 to the actuator member 74. The actuator member 74 is operatively associated with the feed member setting unit 54 that controls the movement of the feed member assembly 44 at the station following the station at which the sensor bar 72 is located. As seen in FIG. 2, the sensing bar 72 detects the absence of an article at station D and its associated actuator member 74 controls the feed member setting unit 54 that moves the feed member assembly 44 at the station C. The sensor 70 controls the movement of the actuator member 74 between a tilted rest position when the station is occupied as shown at 79 in FIG. 2 and an operative position as shown at 80 in FIG. 2 when the station is empty. The actuator member 74 has a center of gravity spaced away from and below its pivotal connection to the transfer bar 18 that causes the actuated member 74 to be biased by gravity toward the operative position. Thus, when a station is empty, the actuator member 74 associated therewith will swing to its upright position shown at 80 where its ramp 76 is in an interfering relationship with the follower member 64 on the feed member setting unit 54.

A reset mechanism 90 is provided at station A to cause all feed member assemblies 44 in the feed position to return to their idle positions during the return stroke of the transfer bar 18. The reset mechanism 90 comprises a knockdown member 92 associated with station A, mounted on the rail 14b, and projecting inwardly toward the rail 18b (FIG. 9). A reset link 94 is affixed to the rod 56 and is located adjacent to and outside of the rail 18b on the tranfer bar 18.

As seen in FIG. 10, the reset link 94 is normally in a horizontal position as shown at 96. Assuming that an empty station exists forwardly of station A on the accumulating conveyor 10, the reset link will be pivoted to a vertical position in response to the upward movement of the transfer bar 18 since the feed member setting unit 54 associated with the station A will be actuated to the operative position to move the feed member assembly 44 to the feed position. When the transfer bar 18 is moved to its upper position, the reset link 94 will be positioned above and behind the knockdown 92, indicated at 98, in its vertical position. A subsequent advancing movement of the transfer bar 18 fowardly will carry the reset link 94 to a position forwardly and above the knockdown 92, indicated at 100. The transfer bar 18 is then lowered depositing the articles 16 at their next stations which lowers the reset link 94 to a position forwardly of the knockdown 92 and in interfering relationship therewith. When the transfer bar 18 is returned to its starting position, the top portion of the reset link 94 engages the knockdown 92 and is pivoted clockwise to its horizontal position shown at 96. The clockwise pivoting of the reset link 94 rotates the rod 56 and therefore the cam link 66 clockwise at the station A, as seen in FIGS. 2-5, which pulls the chain to the left or towards station A. As a result all feed member setting units 54 in front of the feed setting unit 54 at the station A which were in operative positions would be returned to their rest positions. An empty station anywhere in front of the station A will cause the feed member setting unit 54 at the station A to be actuated to the operative position. When the reset link 94 is pivoted to return the feed member setting unit at the station A to the reset position the chain 68 will pull all feed member setting units 54 in front thereof to their rest positions where the feed arms 44a engage stops 102 on the transfer bar 18 (FIG. 8).

In operation, the accumulating conveyor system 10, as seen in FIGS. 2-5, operates to advance the articles 16 toward empty stations so that all stations are filled. Assume that all stations except station D are occupied with articles 16. As shown in FIG. 2, the sensing bar 72 at station D is pivoted to an upright position as the actuator member 74 connected thereto has pivoted gravitationally to an upright position. Station E is occupied so that the weight of the article 16 bears down on the sensor bar 72 causing its associated actuator member 74 to be tilted clockwise. When tilted clockwise, it can be seen that the ramp 76 on the actuator member 74 is in clearance relationship with the follower member 64 on the associated feed member setting unit 54.

The initial upward movement of the transfer bar 18 from its start position (FIG. 2) occurs when the cylinder 27 is actuated to retract the rod 25 which rotates the arms 20 clockwise to vertical positions and which causes the actuator member 74 connected to the sensor bar 72 at the station D to engage the follower member 64 of the feed member setting unit 54 associated with the feed member assembly 44 at station C, the station immediately following the empty station D. FIG. 3 shows the transfer bar 18 moved partially upwardly from the start position. The upward movement of the transfer bar 18 causes the follower member 64 to engage the ramp 76 which pivots the rod 56 causing the push member 58 to engage the arm 44a at the station C. The pivoting movement of the rod 56 causes the cam member 58 to pivot the feed member assembly 44 from its lowered idle position to an elevated position relative to the transfer bar 18.

As shown in FIG. 3, the feed member assemblies 44 at the empty station D and in front of the empty station D remain in their idle positions as the actuators 74 are in their rest positions. The follower members 64 associated with stations D-K, therefore, will not engage those actuators 74 in the rest positions as the transfer bar 18 is moved upwardly from its FIG. 2 position to its FIG. 4 position.

The feed member setting units 54 behind the station C are all actuated to their operative positions by the chain 68. The counterclockwise pivoting of the feed member setting unit 54 at the station C causes the following feed member setting units 54 behind the station C to be pivoted to their operative positions through the chain 68 as it is pulled forwardly by the unit 54 at the station C. The reset link 94 is pivoted to its vertical position in response to the movement of the feed member setting unit 54 at station A to the operative position. It can be seen in FIG. 3 that the chain 68 becomes slack by virtue of its flexible nature between stations C and D as the feed member setting unit 54 at the station D remains in its rest position because the station E is occupied by an article 16.

A continued upward movement of the transfer bar 18 to its feed member set position as shown in FIG. 4 causes the feed member assembly 44 at the station C to lift the article 16 from the rails 14. Similarly, all feed member assemblies 44 following the feed member assembly 44 at station C (the feed member assemblies 44 at stations A and B) will lift the articles 16 from their stations. Next, the transfer bar 18 is moved in a forward stroke by the drive mechanism 34 so that the feed member assembly 44 at the station C carries the article 16 to station D. Similarly, the feed member assembly 44 at station B will simultaneously be advanced to carry an article 16 to the station C. The arms 20 are then swung counterclockwise to lower the transfer bar 18 thereby depositing the articles 16 at their next stations. The drive mechanism 34 is then operated to return the transfer bar 18 to its initial start position shown in FIG. 2. During the return stroke of the transfer bar 18, the reset link 94 strikes the knockdown 92 and is pivoted to its horizontal position. The pivoting of the reset link 94 rotates the rod 56 at the station A to pull the chain 68 rearwardly moving all feed member setting units 54 in the operative positions (stations A, B and C) to their rest positions.

When all stations A-K are filled (FIG. 1), all sensor bars 72 will be pushed down causing their associated actuator members 74 to be moved to their rest positions where they are in clearance relationship with the follower members 62 on their associated feed member setting units 54. A subsequent raising of the transfer bar 18 will have no effect on the feed members 44 since all of the follower members 62 will be in clearance relationship with the actuator members 74. Employment of the flexible chain 68 allows the pulling action and tensioning of the chain to be utilized in actuating all the feed member setting means 54 behind an empty station. Also, as seen in FIG. 6, the chain 68 is positioned below the feed member assemblies 44 in an out-of-the-way position.

From the above description, it can be seen that an efficient accumulator system is provided which provides for the setting of the feed member assemblies to their article carrying positions on the initial upward stroke of the transfer bar 18. The continued upward stroke of the transfer bar 18 lifts the articles from their stations so that they can be carried to the next stations. Since the feed member assemblies 44 are pivoted through an acute angle of approximately thirty degrees between their feed and idle positions, minimum impact forces are generated when they are returned to their idle positions during the return stroke of the transfer bar 18. Therefore, the noise level is kept at a minimum and the components undergo minimum shock wear. Employment of the chain 68 is a simple, effective mode of interconnecting the feed member setting units 54. Its position below the transfer bar 18 prevents the chain 68 from catching the moving articles 16 and serves to prevent personal injury. The accumulating conveyor 10 is efficient and subject to reduced maintenance by virtue of its simple construction.

It is claimed:

1. An accumulating conveyor comprising an elongated support along which a plurality of articles are movable through a series of longitudinally spaced apart stations, a transfer bar mounted for reciprocal movement longitudinally of said elongated support, and for up and down reciprocal movement relative to said elongated support, a plurality of independently movable feed members on said transfer bar movable between idle and feed positions, means for moving said transfer bar up and down and for reciprocating said transfer bar back and forth through a work transfer cycle commencing with the transfer bar in a start position for moving said feed members from one station to the next adjacent station to advance workpieces on said elongated support to fill any empty stations, a plurality of feed member setting units on said transfer bar operatively associated with said feed members and movable between rest and operative positions, each of said feed member setting units being operable when moved to the operative position to move an associated one of said feed members to the feed position, each of said feed member setting units comprising a cam member, a follower member and means pivotally mounting said cam and follower members on said transfer bar for simultaneous movement to the operative position, connecting means connecting adjacent ones of said feed member setting units, and sensing means at each station for sensing the absence of an article, each of said sensing means being operatively associated with a corresponding feed member setting unit that is associated with the feed member at the next following station, said sensing means at an empty station causing the movement of a corresponding feed member setting unit to the operative position upon initial upward movement of said transfer bar from a start position to move the feed member at the station next following said empty station to the feed position, said connecting means acting in response to the movement of said corresponding feed member setting unit to the operative position to move all feed member setting units behind said corresponding feed member setting unit to operative positions to move all feed members associated therewith to feed positions, each of said sensing means comprising an actuator member movable between an inoperative position when an article is located at a corresponding station and an actuating position when said corresponding station is empty, said follower member of one of said feed member setting units engaging an associated actuator member in the actuating position thereof upon upward movement of said transfer bar thereby pivoting said follower member to pivot said cam member into engagement with an associated feed member to move said feed member to the feed position.

2. The accumulating conveyor according to claim 1, vherein said connecting means is flexible and is disposed below said feed members.

3. The accumulating conveyor according to claim 2, wherein said flexible connecting means comprises chain sections connecting adjacent ones of said feed member setting units, said chain sections being disposed below said feed member setting units.

4. The accumulating conveyor according to claim 1, wherein said actuator member of each of said sensing means is pivotally connected to said elongated support and has a center of gravity located with respect to the pivotal connection of said actuator member to said support such that said actuator member is gravitationally biased toward said operative position.

5. The accumulating conveyor according to claim 4, wherein each of said sensing means further includes a sensing member pivotally connected to said support, and link means connecting said actuator member with said sensing member, said actuator member being positioned behind said sensing member to actuate the feed member setting means operatively associated with the feed member at the next following station.

6. An accumulating conveyor comprising an elongated support along which a plurality of articles are movable through a series of longitudinally spaced apart stations, a transfer bar mounted for reciprocal movement longitudinally of said elongated support, and for up and down reciprocal movement relative to said elongated support, a plurality of independently movable feed members on said transfer bar movable between idle and feed positions, means for moving said transfer bar up and down and for reciprocating said transfer bar back and forth through a work transfer cycle commencing with the transfer bar in a start position for moving said feed members from one station to the next adjacent station to advance workpieces on said elongated support to fill any empty stations, a plurality of feed member setting units on said transfer bar operatively associated with said feed members and movable between rest and operative positions, each of said feed member setting units being operable when moved to the operative position to move an associated one of said feed members to the feed position, connecting means connecting adjacent ones of said feed member setting units, and sensing means at each station for sensing the absence of an article, each of said sensing means being operatively associated with a corresponding feed member setting unit that is associated with the feed member at the next following station, said sensing means at an empty station causing the movement of a corresponding feed member setting unit to the operative position upon initial upward movement of said transfer bar from a start position to move the feed member at the station next following said empty station to the feed position, said connecting means acting in response to the movement of said corresponding feed member setting unit to the operative position to move all feed member setting units behind said corresponding feed member setting unit to operative positions to move all feed members associated therewith to feed positions, said means for moving and reciprocating said transfer bar being operable to initially elevate said transfer bar from said start position to a feed member set position wherein all feed members behind an empty station are moved to feed positions, then to advance said transfer bar through a forward stroke a distance at least equal to the distance between adjacent ones of said stations, and to lower and return said transfer bar to said starting position.

7. The accumulating conveyor according to claim 6, wherein selected ones of said sensing means are positioned on one side of said elongated support at alternate stations, and the remaining ones of said sensing means are positioned on the other side of said elongated support at the stations between said alternate stations.

8. The accumulating conveyor according to claim 6, wherein each of said feed members is pivotally mounted on said transfer bar for pivotal movement through an acute angle between said idle and feed positions.

9. The accumulating conveyor according to claim 8, wherein each of said feed members is movable through an angle that is less than forty-five degrees.

10. An accumulating lift and carry conveyor comprising an elongated support along which a plurality of articles are movable through a series of longitudinally spaced apart stations, a transfer bar mounted for reciprocal movement longitudinally of said elongated support, and for up and down reciprocal movement relative to said elongated support, a plurality of independently movable feed members on said transfer bar each movable between an idle position and an article carrying position elevated above said idle position relative to said transfer bar, means for moving said transfer bar up and down and for reciprocating said transfer bar through a work transfer cycle commencing with the transfer bar in a start position for moving said feed members from one station to the next adjacent station, each of said feed members being mounted on a fixed pivot carried by said transfer bar, a plurality of feed member setting units on said transfer bar operatively associated with said feed members and movable between rest and operative positions, each of said setting units being pivotally mounted on said transfer bar for movement relative to said feed members, each of said feed member setting units being operable when pivoted to the operative position to engage and move an associated one of said feed members about its fixed pivot to the article carrying position, connecting means connecting adjacent ones of said feed member setting units, and sensing means at each station for sensing the absence of an article, each of said sensing means being operatively associated with a corresponding feed member setting unit that is associated with the feed member at the next following station, said sensing means at an empty station causing the movement of a corresponding feed member setting unit to the operative position upon initial upward movement of said transfer bar from the starting position to move the feed member at the station following said empty station to the article carrying position to lift an article thereat from said support, said connecting means acting in response to the movement of said corresponding feed member setting unit to the operative position to move all feed member setting units behind said corresponding feed member setting unit to article carrying positions to move all feed members associated therewith to said article carrying positions, said means for moving and reciprocating said transfer bar being operable to advance all feed members in the article carrying positions from one station to the next, to lower said transfer bar depositing articles on the feed members at the next stations, and to return said transfer bar to said start position.

11. The accumulating conveyor according to claim 10 wherein each of said feed members comprises an arm mounted at one end on said fixed pivot and having a cradle portion at the opposite end, said cradle portion being downwardly inclined in the idle position of said feed member and being generally horizontal in said article carrying position of said feed member.

12. The accumulating conveyor according to claim 11 wherein said arm is in a generally horizontal position in said idle position of said feed member and is upwardly inclined at an acute angle to said horizontal position in said article carrying position of said feed member.

* * * * *